(12) United States Patent
Hong et al.

(10) Patent No.: US 10,851,260 B2
(45) Date of Patent: Dec. 1, 2020

(54) ANTI-SCRATCH COATING

(71) Applicant: AGENCY FOR SCIENCE, TECHNOLOGY AND RESEARCH, Singapore (SG)

(72) Inventors: Liang Hong, Singapore (SG); Siok Wei Tay, Singapore (SG); William Sai Yau Wong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 10 days.

(21) Appl. No.: 16/403,482

(22) Filed: May 3, 2019

(65) Prior Publication Data

US 2019/0256732 A1    Aug. 22, 2019

Related U.S. Application Data

(62) Division of application No. 15/320,746, filed as application No. PCT/SG2015/050175 on Jun. 22, 2015, now Pat. No. 10,316,210.

(30) Foreign Application Priority Data

Jun. 20, 2014    (SG) ........................... 10201403496W

(51) Int. Cl.

| C09D 143/04 | (2006.01) |
| C08K 5/09 | (2006.01) |
| C08K 5/54 | (2006.01) |
| B05D 5/00 | (2006.01) |
| C08K 5/544 | (2006.01) |
| C08K 5/549 | (2006.01) |

(52) U.S. Cl.
CPC ............. *C09D 143/04* (2013.01); *B05D 5/00* (2013.01); *C08K 5/09* (2013.01); *C08K 5/54* (2013.01); *C08K 5/544* (2013.01); *C08K 5/549* (2013.01)

(58) Field of Classification Search
None
See application file for complete search history.

(56) References Cited

U.S. PATENT DOCUMENTS 4,130,535 A    12/1978  Coran et al.
5,384,376 A  *  1/1995  Tunney ................. C08G 77/04
                                                    525/431

(Continued)

OTHER PUBLICATIONS

PCT Notification of Transmittal of International Search Report and the Written Opinion of the International Searching Authority, or the Declaration for PCT Counterpart Application No. PCT/SG2015/050175; dated Nov. 3, 2015; 16 pp.

(Continued)

*Primary Examiner* — Robert S Loewe
(74) *Attorney, Agent, or Firm* — Womble Bond Dickinson (US) LLP

(57) ABSTRACT

This invention relates to a hybrid composite polymer matrix, assembled by integrating two polymer networks, as an anti-scratch coating for automobiles. The two types of particulate silane cross-liners are utilized to construct two respective hybrid polymer networks with a unique chain-from-particle structure. At least one hybrid network is a covalently bound network that is interlocked with at least one physically bound hybrid network.

7 Claims, 4 Drawing Sheets

(56) References Cited

U.S. PATENT DOCUMENTS

| | | | | |
|---|---|---|---|---|
| 5,623,030 A * | 4/1997 | Tsumura | ............... | C08G 77/50 |
| | | | | 264/331.11 |
| 8,729,179 B1 * | 5/2014 | Klemarczyk | ......... | C07F 7/1804 |
| | | | | 524/588 |
| 2002/0122946 A1 * | 9/2002 | Kuck | ................ | C08G 77/20 |
| | | | | 428/447 |
| 2005/0244648 A1 * | 11/2005 | Chen | ................ | G03G 15/2057 |
| | | | | 428/413 |
| 2007/0135601 A1 * | 6/2007 | Diakoumakos | ..... | C08L 2666/02 |
| | | | | 526/195 |
| 2008/0279797 A1 * | 11/2008 | Maitra | ................ | A61K 31/80 |
| | | | | 424/64 |
| 2010/0120989 A1 * | 5/2010 | Keller | ................ | C08F 283/00 |
| | | | | 525/326.5 |
| 2010/0125123 A1 * | 5/2010 | Lichtenhan | ............ | C23C 18/122 |
| | | | | 525/326.8 |
| 2011/0045387 A1 * | 2/2011 | Allen | ................ | G03F 7/0757 |
| | | | | 430/5 |
| 2012/0034428 A1 * | 2/2012 | Clarke | ............... | C04B 35/6269 |
| | | | | 428/193 |
| 2013/0334458 A1 * | 12/2013 | Huang | ................ | C08G 77/44 |
| | | | | 252/182.3 |
| 2014/0113988 A1 * | 4/2014 | Mukohata | ............ | C08F 255/02 |
| | | | | 522/120 |
| 2014/0135413 A1 | 5/2014 | Yoo et al. | | |
| 2015/0099848 A1 * | 4/2015 | Fish | ................ | B29C 70/34 |
| | | | | 524/588 |
| 2016/0333171 A1 * | 11/2016 | Kiyomori | ............ | C08F 283/12 |

OTHER PUBLICATIONS

PCT Notification of Transmittal of International Preliminary Report on Patentability for PCT Counterpart Application No. PCT/SG2015/050175; dated May 24, 2016; 15 pp.

Illescas, J., et al.; "Organic-Inorganic Interpenetrating Polymer Networks and Hybrid Polymer Materials Prepared by Frontal Polymerization"; Journal of Polymer Science, Part A: Polymer Chemistry 2013, 51, 4618-4625; 8 pp.

Rose, S. et al., "Time Dependence of Dissipative and Recovery Processes in Nanohybrid Hydrogels", Macromolecules, vol. 46(10), pp. 4095-4104 (2013).

Wang Q., et al.; "Super-tough double-network hydrogels reinforced by covalently compositing with silica-nanoparticles"; Soft Matter, 2012, 8, 6048-6056; 9 pp.

Anon, "Acrylic Hybrid Technology", <URL: http://www.pcimag.com/articles/894118-acrylic-hybrid-technology> 12 pgs. (Oct. 1, 2002).

\* cited by examiner

[Fig. 1]
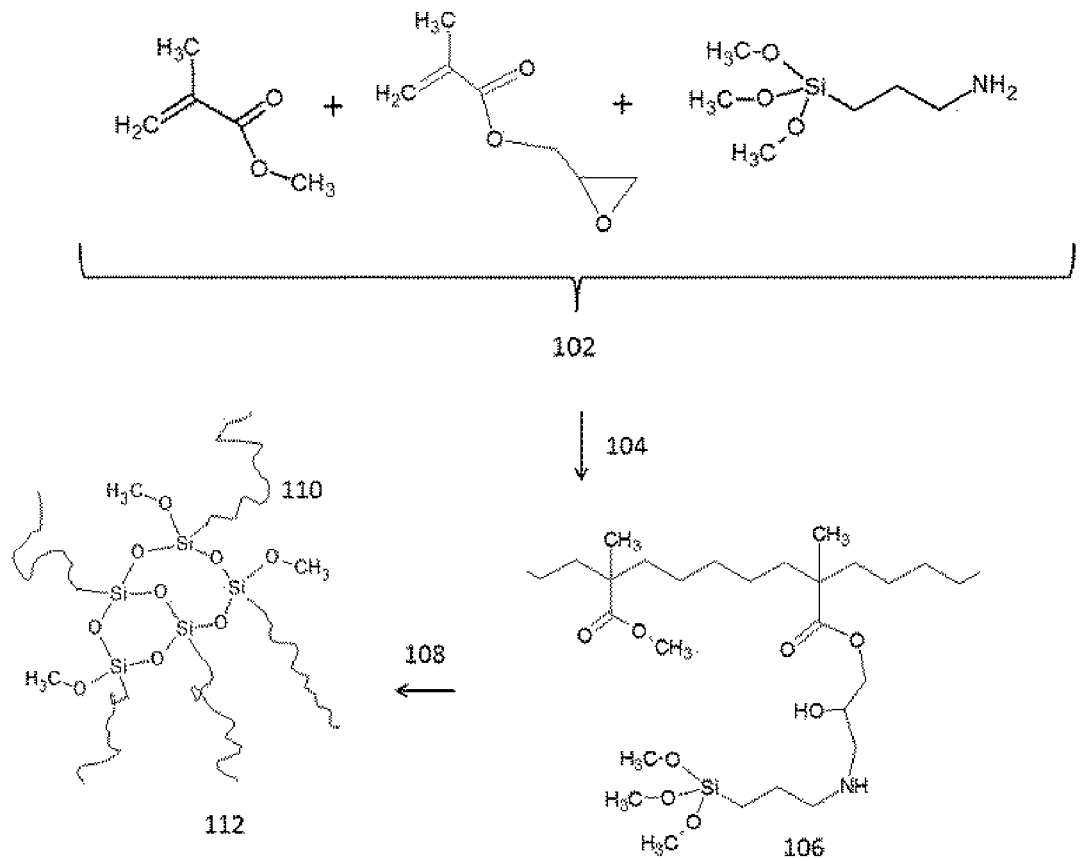
[Fig. 2]
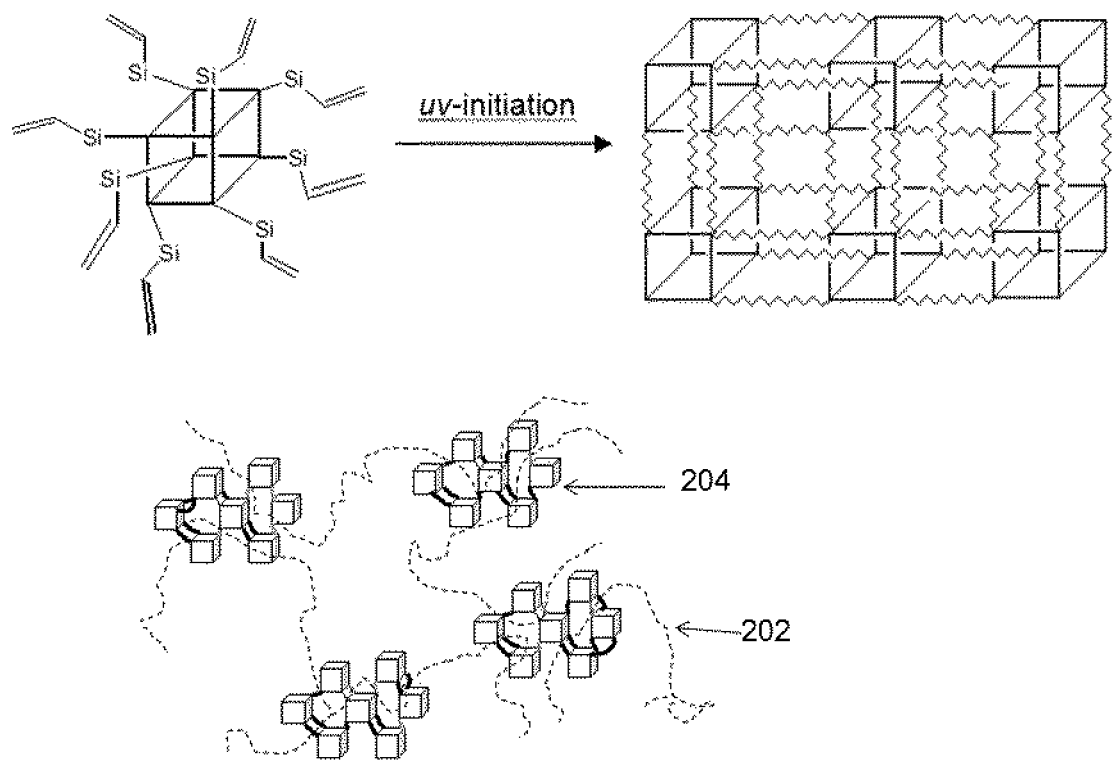

[Fig. 3]
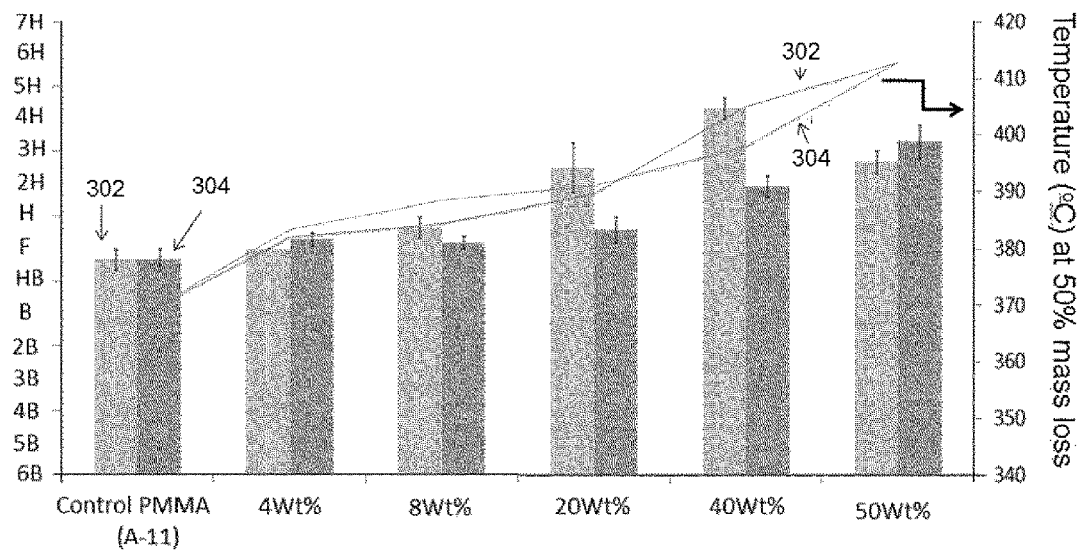
[Fig. 4]
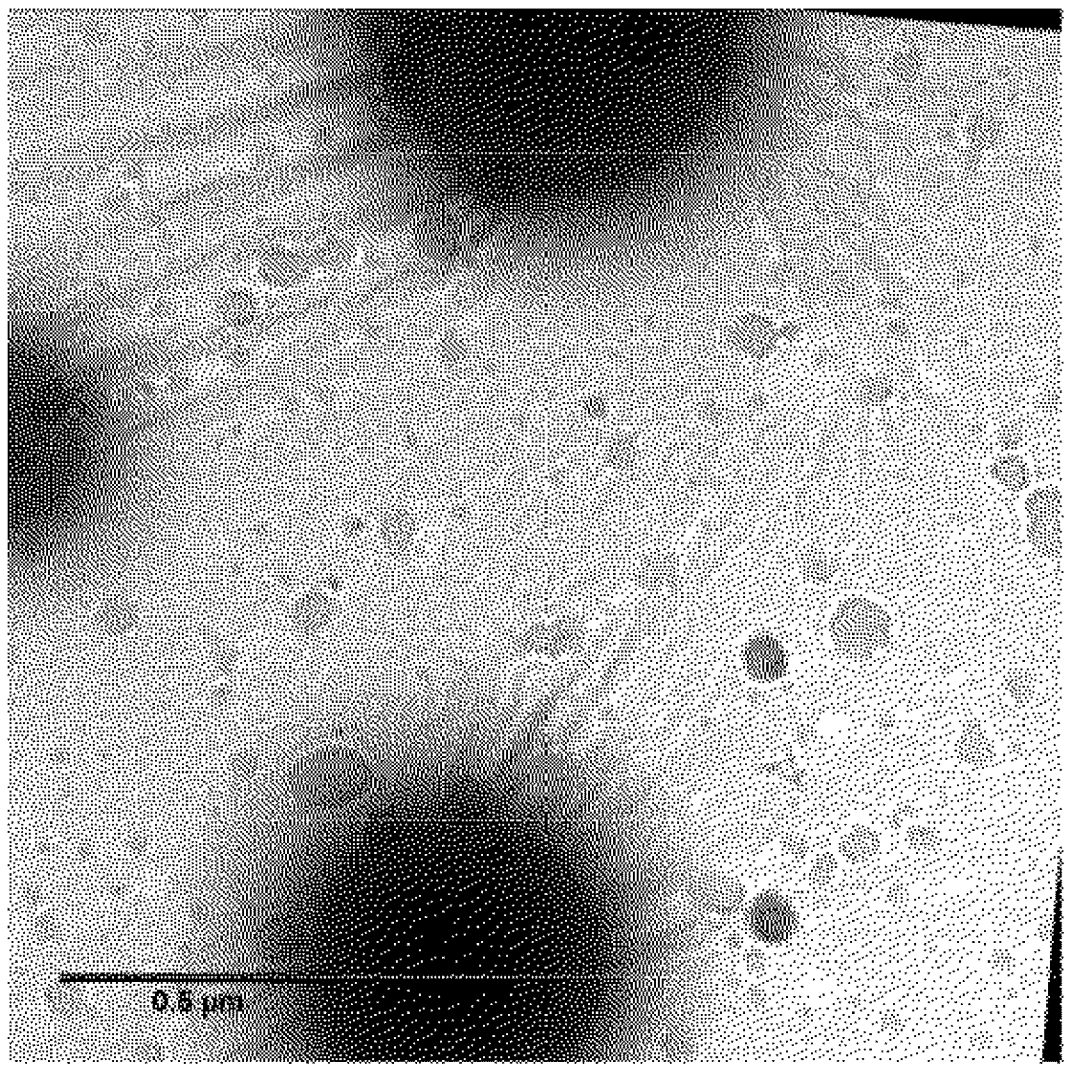

[Fig. 5]
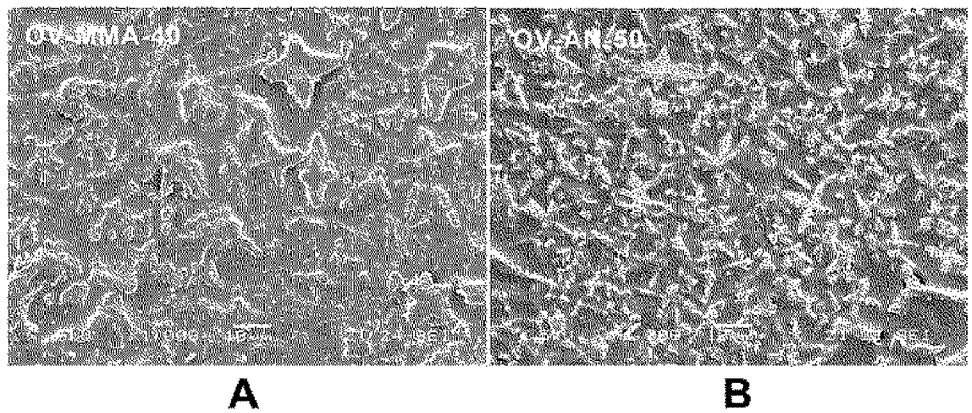
[Fig. 6]
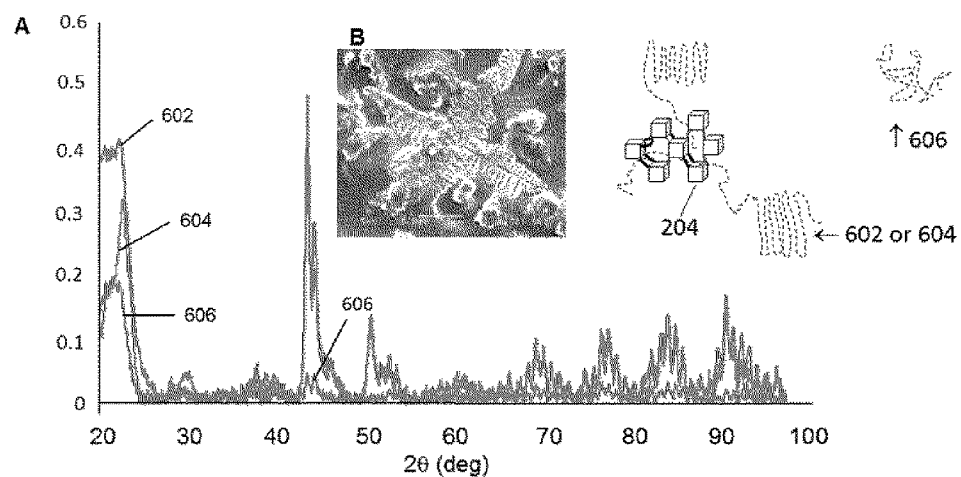
[Fig. 7]
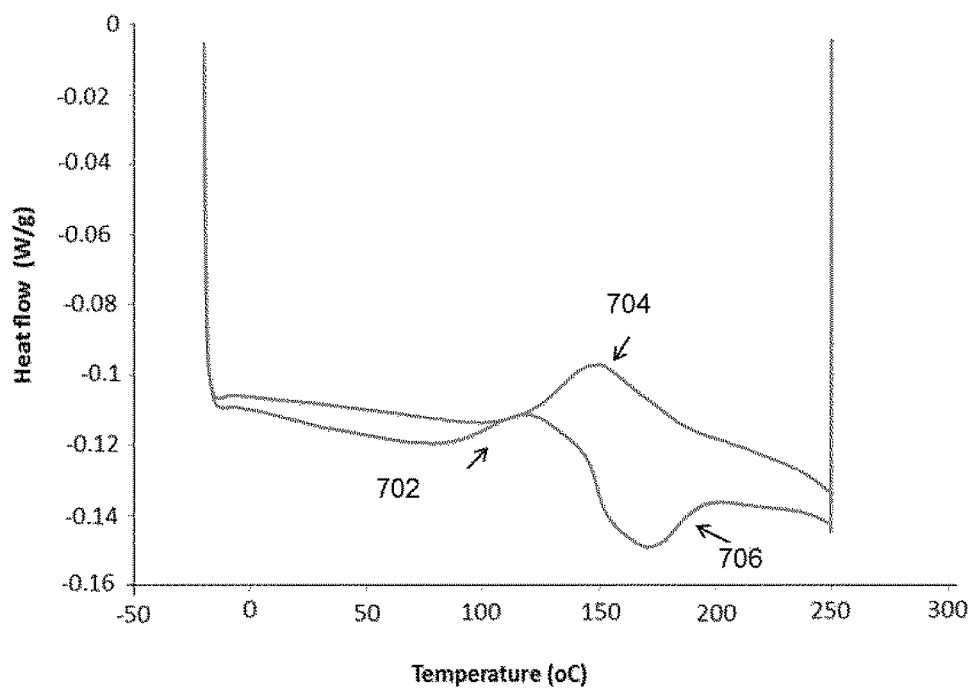

[Fig. 8]
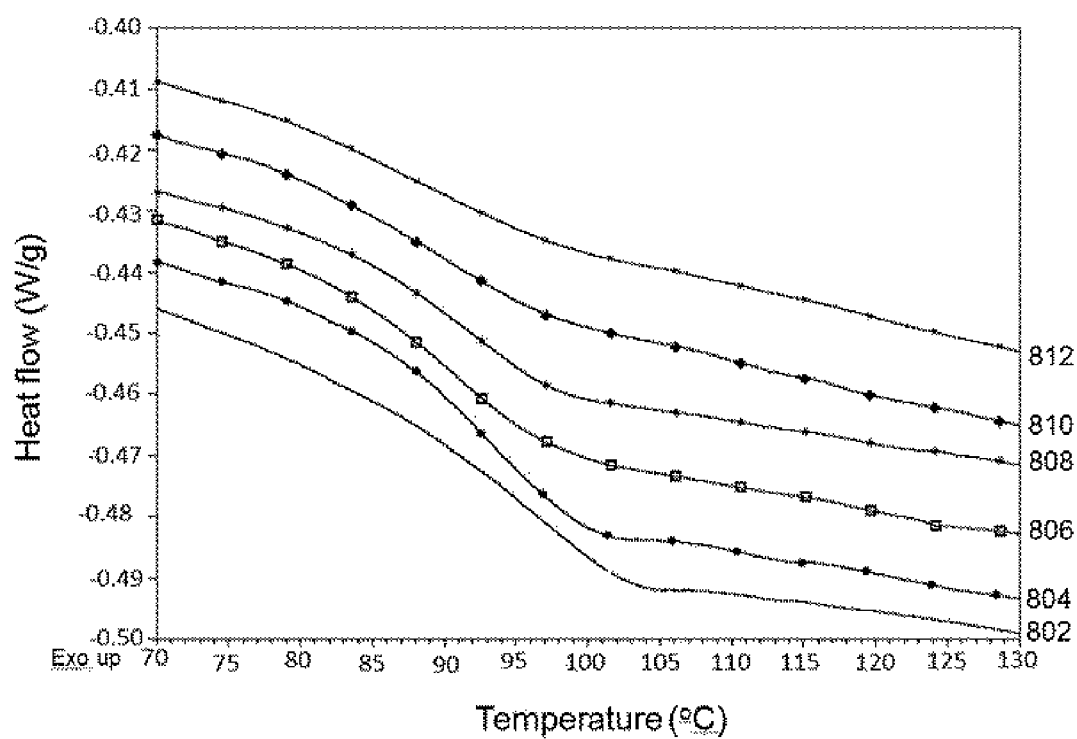

ANTI-SCRATCH COATING

CROSS-REFERENCE TO RELATED APPLICATIONS

This patent application is a divisional application of pending U.S. patent application Ser. No. 15/320,746 filed Dec. 20, 2016 entitled, "ANTI-SCRATCH COATING," which is a U.S. National Phase Application under 35 U.S.C. § 371 of International Application No. PCT/SG2015/050175, filed Jun. 22, 2015, entitled ANTI-SCRATCH COATING, which claims priority to Singapore Patent Application No. 10201403496W, filed Jun. 20, 2014.

TECHNICAL FIELD

The present invention relates to a polymer matrix comprising two hybrid polymer networks. The present invention also relates to a polymer composition and the use of the polymer composition. The present invention further relates to a process for making a polymer coating, a polymer coating obtained by the process and the use of the polymer coating.

BACKGROUND ART

Automotive topcoats must be able to resist damage caused by environmental factors, such as fallout, ultraviolet radiation and high humidity. It must also be able to resist damage caused by scratch and mar resulting from impact, rubbing or abrasion that results in visible scrapes or marring on the surface.

From the perspective of material mechanics, excellent scratch and mar resistance requires the topcoat matrices to have high yield strength in order to minimize plastic flow and necessary elastic strain to avoid brittleness, thereby preventing matrix fracture. Traditionally, automotive topcoats contain thermoplastic resins, most often comprising acrylic, urethane and/or ester polymer chains, which are cross-linked by thermosetting units such as melamine formaldehyde and epoxide in the final thermal curing step. These viscoelastic crosslinking networks are chosen because they offer not only high thresholds of yield-strength for strong abrasion resistance but also environmental durability and optical transparency. However, simple modification of the polymer chain structures and cross-linker to improve polymer properties is limited by the cost of making such improvements, as traditional polymers require the use of expensive organic cross-linkers bearing multiple reactive functional groups and macromers or prepolymers. In addition, mechanical properties at the surface of the topcoat are often quite different from that in the bulk of the coating as the use of multivinyl cross-linkers typically result in a harder bulk phase, which consequently limits the ability to achieve the desired properties. It has therefore been traditionally difficult to tune the ductility of anti-scratch coatings while maintaining a high enough mechanical strength sustained by dense cross-linking and strong chain interactions, making it difficult to obtain a coating matrix that is hard but non-brittle as well.

There is therefore a need to provide a polymer matrix, polymer composition and polymer coating that overcomes or at least ameliorates, one or more of the disadvantages described above. There is also need to provide a method of forming such polymer matrix, polymer composition and polymer coating, as well as a use of the polymer matrix, polymer composition and polymer coating.

SUMMARY OF INVENTION

According to a first aspect, there is provided a polymer matrix comprising two hybrid polymer networks wherein at least one hybrid network is a covalently bound network that is interlocked with at least one physically bound hybrid network. In an embodiment, the hybrid polymer networks may be silane particles of nano or micro meter size.

Advantageously, assimilation of nano-sized inorganic fillers of a specific shape into polymer coating matrices may significantly promote the association between the filler and matrix, which may facilitate the translation of mechanical stress into the inorganic filler through the matrix. For instance, nano-scale silica particles act to reduce the viscoresponse component, resulting in improvement of scratch and abrasion resistance. Further advantageously, the nano or micro meter sized silane particles may comprise manifold organic arms that enable thermodynamic compatibility of the particles with the host polymer matrix through the chain fixation effect of the organic arms.

The polymer matrix may therefore advantageously integrate the nano or micro meter sized inorganic particles such as silane particles as part of the cross-linked polymer network. This may give rise to the particle-chain structure, which is more favourable than the traditional point molecule-to-chain structure, as it allows polymer chain coiling.

Further advantageously, the polymer matrix may utilise the nano-particles as the primary structural foci for upholding the mechanical strength of the coating matrix. The polymer matrix may therefore avoid the use of molecular cross-linkers that are used in traditional cross-linked polymer networks where the main mechanical supporting foci are covalent bonds between or among different polymer chains that do not permit tunability of hardness and flexibility of the polymer network. The hybrid networks may enable this tenability through altering relative spatial occupation of polymer chains that is recoverable upon the removal of external shear stress.

More advantageously, the covalently bound network may provide an elastic framework for responding to shear stress, while the physically bound hybrid network may provide a viscoelastic framework to offer chain yielding that buffers high shear stress by its orderly packed chain domains. Advantageously, this strategy of integrating nano or micro meter sized inorganic particles such as silane particles into the polymer matrix (that is, the integration of the covalently bound network and the physically bound network) may lead to improvements in shear modulus while permitting the elastic strain (flexibility) and yield strength (hardness) to be tuned for improved fracture resistance. The chain-to-particle network design of the present disclosure could more effectively integrate the elastic and viscous properties into the polymer matrix than conventional chain-to-point network designs with dominant elastic property. In addition, this strategy may no longer require the use of specific molecular cross-linkers and monomers to attain a strong cross-linked polymer matrix. Further advantageously, the polymer matrix may be manufactured more cost-effectively since it avoids the use of expensive organic cross-linkers bearing multiple reactive functional groups and macromers or prepolymers. More advantageously, the polymer matrix may have an improved fracture resistance compared to conventional hard coatings.

In an embodiment, the matrix may comprise the two hybrid networks and at least one high molecular weight polymer. The high molecular weight polymer may penetrate both hybrid networks due to their thermodynamic compatibility enabling them to have a lubricating role by chain creeping and reducing rigid interactions between the two hybrid networks.

Further advantageously, the matrix may have improved structural stability against UV-irradiation because it may not contain traditional organic cross-linkers that contain tertiary carbons that may be sensitive to UV irradiation.

In a second aspect, there is provided a polymer composition comprising (a) 30 to 50% wt. of a high molecular poly(vinyl)polymer, (b) 3 to 30% wt. of a silane, (c) 3 to 30% wt. of a silane cage component, (d) 5 to 25% wt. of a functionalized vinyl polymer, (e) 3 to 30% wt. of a vinyl monomer.

In a third aspect, there is provided the use of a composition as defined above.

In a fourth aspect, there is provided a process for making a polymer coating comprising the steps of (a) preparing a polymer composition as defined above by mixing the components and adding a radical polymerisation initiator by UV-irradiation, (b) homogenizing the mixture, (c) coating a substrate with the obtained mixture, (d) starting a radical polymerization, and (e) curing the prepared coating film at elevated temperature.

Advantageously, the in-situ generation of the copolymer chains covalently link to the particulate cross-linker bearing pendant reactive functional groups and mechanically entangle with the second cross-linker. This facilitates complementary cohesion between the two hybrid networks.

In a fifth aspect, there is provided a polymer coating obtained by the process as defined above.

In a sixth aspect, there is provided a use of the polymer coating as defined above for anti-scratch automotive top coats.

DEFINITIONS

The following words and terms used herein shall have the meaning indicated:

The term "hybrid polymer network" may be used interchangeably with "Interpenetrating Polymer Network (IPN)" and refers to a polymer matrix comprising two or more networks which are at least partially interlaced on a polymer scale (i.e. the end-to-end distance of a random chain coil, ca. a few nanometers). The network cannot be separated unless chemical bonds are broken. The two or more networks can be envisioned to be entangled in such a way that they are concatenated in 3D directions and cannot be pulled apart, but not bonded to each other by any chemical bond.

The term "hybrid" refers to a component with a structure other than solely a hydrocarbon structure.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF OPTIONAL EMBODIMENTS

Exemplary, non-limiting embodiments of a polymer matrix will now be disclosed.

A polymer matrix may comprise two hybrid polymer networks wherein at least one hybrid network may be a covalently bound network that is interlocked with at least one physically bound hybrid network.

The hybrid polymer networks may be shored by cross links that are silane particles of nano or micro meter size. The silane particles may have a size in the range of about 1 nm to about 1 µm, about 1 nm to about 2 nm, about 1 nm to about 5 nm, about 1 nm to about 10 nm, about 1 nm to about 20 nm, about 1 nm to about 50 nm, about 1 nm to about 100 nm, about 1 nm to about 200 nm, about 1 nm to about 500 nm, about 2 nm to about 5 nm, about 2 nm to about 10 nm, about 2 nm to about 20 nm, about 2 nm to about 50 nm, about 2 nm to about 100 nm, about 2 nm to about 200 nm, about 2 nm to about 500 nm, about 2 nm to about 1 µm, about 5 nm to about 10 nm, about 5 nm to about 20 nm, about 5 nm to about 50 nm, about 5 nm to about 100 nm, about 5 nm to about 200 nm, about 5 nm to about 500 nm, about 5 nm to about 1 µm, about 10 nm to about 20 nm, about 10 nm to about 50 nm, about 10 nm to about 100 nm, about 10 nm to about 200 nm, about 10 nm to about 500 nm, about 10 nm to about 1 µm, about 20 nm to about 50 nm, about 20 nm to about 100 nm, about 20 nm to about 200 nm, about 20 nm to about 500 nm, about 20 nm to about 1 µm, about 50 nm to about 100 nm, about 50 nm to about 200 nm, about 50 nm to about 500 nm, about 50 nm to about 1 µm, about 100 nm to about 200 nm, about 100 nm to about 500 nm, about 100 nm to about 1 µm, about 200 nm to about 500 nm, about 200 nm to about 1 µm or about 500 nm to about 1 µm.

The covalently bound network may comprise a silane nanocluster covalently linked to polymer chains and the physically bound hybrid network may comprise a block of nano to micro meter size silane cages physically binding several polymer chains together.

The covalently bound hybrid network may be obtained by covalently linking a silane compound to a functionalized copolymer followed by a cluster formation.

The silane compound may comprise a primary amine group carrying alkoxysilane and the copolymer may comprise a functional group to react with this primary amine group.

The silane compound may be any aminoalkylsilane, such as 2-amino ethyltrimethoxysilane, 3-amino propyltrimethoxysilane, 4-aminobutyltrimethoxysilane, 5-aminopentyltrimethoxysilane, 6-aminohexyltrimethoxysilane, 7-aminoheptyltrimethoxysilane, 8-aminooctyltrimethoxysilane, 9-aminononyltrimethoxysilane or 10-aminodecyltrimethoxysilane. The silane compound may be 3-amino propyltrimethoxylsilane.

The silane nanocluster may have a radiating structure. The radiating structure may comprise radiating polymer chains that possess ordered chain assembling from a foci in contrast to when the chains undergo random entangling. The radiating structure may be a fern leaf-like dendrite, hairy particles or hairy rods.

The functionalized copolymer may be a vinyl copolymer. The functionalized copolymer may be an acrylic or styrenic copolymer, bearing a functional group that can form a covalent bond with amino groups. The functional group may be glycidyl, aldehyde, ketone, halide or anhydride group. The functional group may be a strong dipole group. The strong dipole group may be nitrile, nitro or sulfone groups. The functionalized copolymer may be a copolymer of monomers selected from the group consisting of glycidyl acrylate, glycidyl methacrylate, methyl methacrylate, methyl acrylate, acrylonitrile, 3-butenenitrile, 4-pentenenitrile, 5-hexenenitrile, 6-heptenenitrile, 7-octenenitrile, 8-nonenenitrile, 9-decenenitrile and any mixture thereof.

The functionalized copolymer may be a copolymer of glycidyl methacrylate and a vinyl monomer selected from methyl methacrylate, acrylonitrile or a mixture thereof.

The physically bound hybrid network may be obtained by reaction of silane cage with a polymer monomer in the presence of a high molecular weight polymer.

The silane cage may be a polyhedral oligomeric silsesquioxane. Silsesquioxane may be an organosilicon compound with the empirical chemical formula $RSiO_{3/2}$ where R may be hydrogen, optionally substituted alkyl, optionally substituted alkenyl, optionally substituted cycloalkyl, optionally substituted heterocycloalkyl, optionally substituted aryl or optionally substituted heteroaryl group. Silsesquioxanes may have a cage-like structure, in the form of a cube, hexagonal prism, octagonal prism, decagonal prism or a dodecagonal prism. The silsesquioxane may have an open cage-like structure. The silsesquioxane cage may have high symmetry and may be optionally substituted with any functional group.

The term "optionally substituted" as used herein means the group to which this term refers may be unsubstituted, or may be substituted with one or more groups independently selected from alkyl, alkenyl, alkynyl, thioalkyl, cycloalkyl, cycloalkylalkyl, cycloalkenyl, cycloalkylalkenyl, heterocycloalkyl, cycloalkylheteroalkyl, cycloalkyloxy, cycloalkenyloxy, cycloamino, halo, carboxyl, haloalkyl, haloalkynyl, alkynyloxy, heteroalkyl, heteroalkyloxy, hydroxyl, hydroxyalkyl, alkoxy, thioalkoxy, alkenyloxy, haloalkoxy, haloalkenyl, haloalkynyl, haloalkenyloxy, nitro, amino, nitroalkyl, nitroalkenyl, nitroalkynyl, nitroheterocyclyl, alkylamino, dialkylamino, alkenylamine, aminoalkyl, alkynylamino, acyl, alkyloxy, alkyloxyalkyl, alkyloxyaryl, alkyloxycarbonyl, alkyloxycycloalkyl, alkyloxyheteroaryl, alkyloxyheterocycloalkyl, alkenoyl, alkynoyl, acylamino, diacylamino, acyloxy, alkylsulfonyloxy, heterocyclic, heterocycloalkenyl, heterocycloalkyl, heterocycloalkylalkyl, heterocycloalkylalkenyl, heterocycloalkylheteroalkyl, heterocycloalkyloxy, heterocycloalkenyloxy, heterocycloxy, heterocycloamino, haloheterocycloalkyl, alkylsulfinyl, alkylsulfonyl, alkylsulfenyl, alkylcarbonyloxy, alkylthio, acylthio, aminosulfonyl, phosphorus-containing groups such as phosphono and phosphinyl, sulfinyl, sulfinylamino, sulfonyl, sulfonylamino, aryl, heteroaryl, heteroarylalkyl, heteroarylalkenyl, heteroarylheteroalkyl, heteroarylamino, heteroaryloxy, arylalkenyl, arylalkyl, alkylaryl, alkylheteroaryl, aryloxy, arylsulfonyl, cyano, cyanate, isocyanate, —C(O)NH(alkyl), and —C(O)N(alkyl)$_2$.

"Alkenyl" as a group or part of a group denotes an aliphatic hydrocarbon group containing at least one carbon-carbon double bond and which may be straight or branched preferably having 2-12 carbon atoms, more preferably 2-10 carbon atoms, most preferably 2-6 carbon atoms, in the normal chain. The group may contain a plurality of double bonds in the normal chain and the orientation about each is independently E or Z. Exemplary alkenyl groups include, but are not limited to, ethenyl, propenyl, butenyl, pentenyl, hexenyl, heptenyl, octenyl and nonenyl. The group may be a terminal group or a bridging group.

"Alkyl" as a group or part of a group refers to a straight or branched aliphatic hydrocarbon group, preferably a $C_1$-$C_{12}$ alkyl, more preferably a $C_1$-$C_{10}$ alkyl, most preferably $C_1$-$C_6$ unless otherwise noted. Examples of suitable straight and branched $C_1$-$C_6$ alkyl substituents include methyl, ethyl, n-propyl, 2-propyl, n-butyl, sec-butyl, t-butyl, hexyl, and the like. The group may be a terminal group or a bridging group.

"Aryl" as a group or part of a group denotes (i) an optionally substituted monocyclic, or fused polycyclic, aromatic carbocycle (ring structure having ring atoms that are all carbon) preferably having from 5 to 12 atoms per ring. Examples of aryl groups include phenyl, naphthyl, and the like; (ii) an optionally substituted partially saturated bicyclic aromatic carbocyclic moiety in which a phenyl and a $C_{5-7}$ cycloalkyl or $C_{5-7}$ cycloalkenyl group are fused together to form a cyclic structure, such as tetrahydronaphthyl, indenyl or indanyl. The group may be a terminal group or a bridging group. Typically an aryl group is a $C_6$-$C_{18}$ aryl group.

"Arylalkenyl" means an aryl-alkenyl-group in which the aryl and alkenyl are as defined herein. Exemplary arylalkenyl groups include phenylallyl. The group may be a terminal group or a bridging group. If the group is a terminal group it is bonded to the remainder of the molecule through the alkenyl group.

A "bond" is a linkage between atoms in a compound or molecule. The bond may be a single bond, a double bond, or a triple bond.

"Cycloalkyl" refers to a saturated monocyclic or fused or spiro polycyclic, carbocycle preferably containing from 3 to 9 carbons per ring, such as cyclopropyl, cyclobutyl, cyclopentyl, cyclohexyl and the like, unless otherwise specified. It includes monocyclic systems such as cyclopropyl and cyclohexyl, bicyclic systems such as decalin, and polycyclic systems such as adamantane. A cycloalkyl group typically is a $C_3$-$C_{12}$ alkyl group. The group may be a terminal group or a bridging group.

"Halogen" represents chlorine, fluorine, bromine or iodine.

"Heteroaryl" either alone or part of a group refers to groups containing an aromatic ring (preferably a 5 or 6 membered aromatic ring) having one or more heteroatoms as ring atoms in the aromatic ring with the remainder of the ring atoms being carbon atoms. Suitable heteroatoms include nitrogen, oxygen and sulphur. Examples of heteroaryl include thiophene, benzothiophene, benzofuran, benzimidazole, benzoxazole, benzothiazole, benzisothiazole, naphtho[2,3-b]thiophene, furan, isoindolizine, xantholene, phenoxatine, pyrrole, imidazole, pyrazole, pyridine, pyrazine, pyrimidine, pyridazine, tetrazole, indole, isoindole, 1H-indazole, purine, quinoline, isoquinoline, phthalazine, naphthyridine, quinoxaline, cinnoline, carbazole, phenanthridine, acridine, phenazine, thiazole, isothiazole, phenothiazine, oxazole, isooxazole, furazane, phenoxazine, 2-, 3- or 4-pyridyl, 2-, 3-, 4-, 5-, or 8-quinolyl, 1-, 3-, 4-, or 5-isoquinolinyl 1-, 2-, or 3-indolyl, and 2-, or 3-thienyl. A heteroaryl group is typically a $C_1$-$C_{18}$ heteroaryl group. The group may be a terminal group or a bridging group.

"Heterocyclic" refers to saturated, partially unsaturated or fully unsaturated monocyclic, bicyclic or polycyclic ring system containing at least one heteroatom selected from the group consisting of nitrogen, sulfur and oxygen as a ring atom. Examples of heterocyclic moieties include heterocycloalkyl, heterocycloalkenyl and heteroaryl.

The controlled orientation of silsesquioxanes in 3-D space may allow for highly tailored nanometer-by-nanometer construction in all three dimensions. The silica core may confer rigidity and thermal stability that may provide mechanical and thermal properties surpassing typical organic compounds. Combining the robust core with functionalities of attached organic groups may change the physical properties of the silsesquioxane, allowing for easier processing. The mixture of organic and inorganic functionalities may lead to the creation of novel nanocomposite materials that exhibit properties intermediate and superior to those of traditional polymers.

The silane cage may be octavinyl polyhedral oligomeric silsesquioxane.

The silane cage may be polymerized to form nano to micro meter size blocks. The polymerization may occur by free radical polymerization. The free radical polymerization may be initiated by UV irradiation. The functionalized copolymer may be grafter to the anno to micro size blocks upon polymerization.

The ratio between the primary amine group carrying alkoxysilane and the silane cage may be between about 6:1 and 2:1, preferably about 3:1, about 4:1 or about 5:1.

The matrix may comprise the hybrid networks and at least one high molecular weight polymer.

The high molecular weight polymer may have a molecular weight in the range of about 300,000 to about 500,000, about 300,000 to about 350,000, about 300,000 to about 400,000, about 300,000 to about 450,000, about 350,000 to about 400,000, about 350,000 to about 450,000, about 350,000 to about 500,000, about 400,000 to about 450,000, about 400,000 to about 500,000 or about 450,000 to about 500,000. Since the dosage of polymer is by the percentage of weight (wt %), the same wt % may mean more polymer chains for a lower molecular weight polymer. Too high a molecular weight may be undesirable as it may result in a highly viscous coating formulation.

The high molecular weight polymer may be an acrylic or styrenic polymer, comprising a homopolymer, a copolymer or a blend thereof. The high molecular weight polymer may be poly(methyl methacrylate) (PMMA) homopolymer, or an acrylic copolymer containing predominantly PMMA, and may include PARALOID™ A-11, PARALOID™ A-10 or PARALOID™ A-101. Other appropriate commercial acrylic copolymers may include PARALOID™ B-series such as PARALOID™ B-82. The high molecular weight polymer may be a polystyrene homopolymer or copolymers of styrene. Copolymers of styrene may be with acrylonitrile, butadiene, or a mixture thereof. The high molecular weight polymer may be polyvinyl chloride, polyvinylacetate, polyesters, polyurethanes or mixtures thereof.

PARALOID™ A-11 may be the PARALOID™ A-11 polymer delivered to the market by Rohm and Haas Company on 7 Dec. 2011. PARALOID™ B-82 may be the PARALOID™ B-82 polymer delivered to the market by Rohm and Haas Company in 2007.

The poly (methyl methacrylate) chains may be interpenetrating with the hybrid polymer network after in-situ creation of the hybrid network in the presence of the poly (methyl methacrylate) chains.

Exemplary, non-limiting embodiments of a polymer composition will now be disclosed.

A polymer composition may comprise: (a) 30 to 50% wt. of a high molecular poly(vinyl) polymer, (b) 3 to 30% wt. of a silane, (c) 3 to 30% wt. of a silane cage component, (d) 5 to 25% wt. of a functionalized vinyl monomer, and (e) 3 to 30% wt. of a vinyl monomer.

The components (a) to (e) may add up to 100% wt. in total.

The polymer composition may comprise about 30% wt to about 50% wt, about 30% wt to about 40% wt. or about 40% wt to about 50% wt of a high molecular weight poly(vinyl) polymer.

The polymer composition may comprise about 3% wt to about 30% wt, about 3% wt to about 6% wt, about 3% wt to about 9% wt, about 3% wt to about 12% wt, about 3% wt to about 15% wt, about 3% wt to about 18% wt, about 3% wt to about 21% wt, about 3% wt to about 24% wt, about 3% wt to about 27% wt, about 6% wt to about 9% wt, about 6% wt to about 12% wt, about 6% wt to about 15% wt, about 6% wt to about 18% wt, about 6% wt to about 21% wt, about 6% wt to about 24% wt, about 6% wt to about 27% wt, about 6% wt to about 30% wt, about 9% wt to about 12% wt, about 9% wt to about 15% wt, about 9% wt to about 18% wt, about 9% wt to about 21% wt, about 9% wt to about 24% wt, about 9% wt to about 27% wt, about 9% wt to about 30% wt, about 12% wt to about 15% wt, about 12% wt to about 18% wt, about 12% wt to about 21% wt, about 12% wt to about 24% wt, about 12% wt to about 27% wt, about 12% wt to about 30% wt, bout 15% wt to about 18% wt, about 15% wt to about 21% wt, about 15% wt to about 24% wt, about 15% wt to about 27% wt, about 15% wt to about 30% wt, about 18% wt to about 21% wt, about 18% wt to about 24% wt, about 18% wt to about 27% wt, about 18% wt to about 30% wt, about 21% wt to about 24% wt, about 21% wt to about 27% wt, about 21% wt to about 30% wt, about 24% wt to about 27% wt, about 24% wt to about 30% wt or about 27% wt to about 30% wt of a silane.

The polymer composition may comprise about 3% wt to about 30% wt, about 3% wt to about 6% wt, about 3% wt to about 9% wt, about 3% wt to about 12% wt, about 3% wt to about 15% wt, about 3% wt to about 18% wt, about 3% wt to about 21% wt, about 3% wt to about 24% wt, about 3% wt to about 27% wt, about 6% wt to about 9% wt, about 6% wt to about 12% wt, about 6% wt to about 15% wt, about 6% wt to about 18% wt, about 6% wt to about 21% wt, about 6% wt to about 24% wt, about 6% wt to about 27% wt, about 6% wt to about 30% wt, about 9% wt to about 12% wt, about 9% wt to about 15% wt, about 9% wt to about 18% wt, about 9% wt to about 21% wt, about 9% wt to about 24% wt, about 9% wt to about 27% wt, about 9% wt to about 30% wt, about 12% wt to about 15% wt, about 12% wt to about 18% wt, about 12% wt to about 21% wt, about 12% wt to about 24% wt, about 12% wt to about 27% wt, about 12% wt to about 30% wt, bout 15% wt to about 18% wt, about 15% wt to about 21% wt, about 15% wt to about 24% wt, about 15% wt to about 27% wt, about 15% wt to about 30% wt, about 18% wt to about 21% wt, about 18% wt to about 24% wt, about 18% wt to about 27% wt, about 18% wt to about 30% wt, about 21% wt to about 24% wt, about 21% wt to about 27% wt, about 21% wt to about 30% wt, about 24% wt to about 27% wt, about 24% wt to about 30% wt or about 27% wt to about 30% wt of a silane cage component.

The polymer composition may comprise about 5% wt to about 25% wt, about 5% wt to about 10% wt, about 5% wt to about 15% wt, about 5% wt to about 20% wt, about 10% wt to about 15% wt, about 10% wt to about 20% wt, about 10% wt to about 25% wt, about 15% wt to about 20% wt, about 15% wt to about 25% wt or about 20% wt to about 25% wt of a functionalized vinyl monomer.

The polymer composition may comprise about 3% wt to about 30% wt, about 3% wt to about 6% wt, about 3% wt to about 9% wt, about 3% wt to about 12% wt, about 3% wt to about 15% wt, about 3% wt to about 18% wt, about 3% wt to about 21% wt, about 3% wt to about 24% wt, about 3% wt to about 27% wt, about 6% wt to about 9% wt, about 6% wt to about 12% wt, about 6% wt to about 15% wt, about 6% wt to about 18% wt, about 6% wt to about 21% wt, about 6% wt to about 24% wt, about 6% wt to about 27% wt, about 6% wt to about 30% wt, about 9% wt to about 12% wt, about 9% wt to about 15% wt, about 9% wt to about 18% wt, about 9% wt to about 21% wt, about 9% wt to about 24% wt, about 9% wt to about 27% wt, about 9% wt to about 30% wt, about 12% wt to about 15% wt, about 12% wt to about 18% wt, about 12% wt to about 21% wt, about 12% wt to about 24% wt, about 12% wt to about 27% wt, about 12% wt to about 30% wt, bout 15% wt to about 18% wt, about 15% wt to about 21% wt, about 15% wt to about 24% wt, about 15% wt to about 27% wt, about 15% wt to about 30% wt, about 18% wt to about 21% wt, about 18% wt to about 24% wt, about 18% wt to about 27% wt, about 18% wt to about 30% wt, about 21% wt to about 24% wt, about 21% wt to about 27% wt, about 21% wt to about 30% wt, about 24% wt to about 27% wt, about 24% wt to about 30% wt or about 27% wt to about 30% wt of a vinyl monomer.

The molar ratio of silane to silane cage component may be between about 6/1 and about 2/1, about 6/1 to about 5/1, about 6/1 to about 4/1, about 6/1 to about 3/1, about 5/1 to about 4/1, about 5/1 to about 3/1, about 4/1 to about 2/1, about 4/1 to about 3/1, about 4/1 to about 2/1 or about 3/1 to about 2/1.

The weight ratio of components (c+d+e) may be between about 30 and about 50 percent by weight, about 30 and about 35 percent by weight, about 30 and about 40 percent by weight, about 30 and about 45 percent by weight, about 35 and about 40 percent by weight, about 35 and about 45 percent by weight, about 35 and about 50 percent by weight, about 40 and about 45 percent by weight, about 40 and about 50 percent by weight or about 45 and about 50 percent by weight of components (a+b+c+d+e).

Components a/b/d/e may be present in a mass ratio of about 22-28/8-12/6-8/6-8 or about 24-26/9-11/6-8/6-8. Components a/b/d/e may be present in a mass ratio of about 25/10/6-8/6-8. Components a/b/d/e may be present in a mass ratio of about 25/10/7/7.

The poly(vinyl) polymer may have a molecular weight in the range of about 300,000 to about 500,000, about 300,000 to about 350,000, about 300,000 to about 400,000, about 300,000 to about 450,000, about 350,000 to about 400,000, about 350,000 to about 450,000, about 350,000 to about 500,000, about 400,000 to about 450,000, about 400,000 to about 500,000 or about 450,000 to about 500,000. Since the dosage of polymer is by the percentage of weight (wt %), the same wt % may mean more polymer chains for a lower molecular weight polymer. Too high a molecular weight may be undesirable as it may result in a highly viscous coating formulation.

The poly(vinyl) polymer may be poly(methyl methacrylate) or may be a blend of poly(methyl methacrylate) with other polymers. The poly(methyl methacrylate) may be PARALOID™ A-11, PARALOID™ A-10 or PARALOID™ A-101. Other appropriate commercial acrylic copolymers may include PARALOID™ B-series such as PARALOID™ B-82. The high molecular weight polymer may be a polystyrene homopolymer or copolymers of styrene. Copolymers of styrene may be with acrylonitrile, butadiene, or a mixture thereof. The high molecular weight polymer may be polyvinyl chloride, polyvinylacetate, polyesters, polyurethanes or mixtures thereof. The silane cage may be a polyhedral oligomeric silsesquioxane. Silsesquioxane may be an organosilicon compound with the empirical chemical formula $RSiO_{3/2}$ where R may be hydrogen, optionally substituted alkyl, optionally substituted alkenyl, optionally substituted cycloalkyl, optionally substituted heterocycloalkyl, optionally substituted aryl or optionally substituted heteroaryl group. Silsesquioxanes may have a cage-like structure, in the form of a cube, hexagonal prism, octagonal prism, decagonal prism or a dodecagonal prism. The silsesquioxane may have an open cage-like structure. The silsesquioxane cage may have high symmetry and may be optionally substituted with any functional group.

The controlled orientation of silsesquioxanes in 3-D space may allow for highly tailored nanometer-by-nanometer construction in all three dimensions. The silica core may confer rigidity and thermal stability that may provide mechanical and thermal properties surpassing typical organic compounds. Combining the robust core with functionalities of attached organic groups may change the physical properties of the silsesquioxane, allowing for easier processing. The mixture of organic and inorganic functionalities may lead to the creation of novel nanocomposite materials that exhibit properties intermediate and superior to those of traditional polymers.

The silane cage component may be octavinyl polyhedral oligomeric silsesquioxane.

The silane may be a primary amine group carrying alkoxysilane and the copolymer may be functionalized to react with this primary amine group.

The silane may be any aminoalkyl silane. The aminoalkylsilane may be 2-amino ethyltrimethoxysilane, 3-amino propyltrimethoxysilane, 4-aminobutyltrimethoxysilane, 5-aminopentyltrimethoxysilane, 6-aminohexyltrimethoxysilane, 7-aminoheptyltrimethoxysilane, 8-aminooctyltrimethoxysilane, 9-aminononyltrimethoxysilane or 10-aminodecyltrimethoxysilane. The silane may be 3-amino propyltrimethoxylsilane.

The functionalized vinyl monomer may be a epoxy group modified vinyl monomer.

The functionalized monomer may be a glycidyl group modified vinyl monomer. The functionalized vinyl monomer may be glycidyl acrylate or glycidyl methacrylate.

The silane may be 3-amino propyltrimethoxylsilane and the functionalized vinyl monomer may be a glycidyl group modified vinyl monomer.

The ratio between the primary amine group carrying alkoxysilane and the silane cage may be between about 6:1 and 2:1, preferably about 3:1, about 4:1 or about 5:1.

The use of a composition as defined above may be to make a polymer coating.

Exemplary, non-limiting embodiments of a process for making a polymer coating will now be disclosed.

A process for making a polymer coating may comprise the steps of: (a) preparing a polymer composition as defined above by mixing the components and optionally adding a radical polymerisation initiator, (b) homogenizing the mixture, (c) coating a substrate with the obtained mixture, (d) starting a radical polymerisation by UV-irradiation, and (e) curing the prepared coated film at elevated temperature.

The polymerization initiatior may be a UV-polymerization initiator. The polymerization initiator may be 2,2-dimethoxy-2-phenylacetophenone (DMPA).

The homogenizing may be done by stirring or mixing, or by any technique known to a person skilled in the art that will result in the mixture becoming homogenized.

The substrate may be a metal, glass, plastic or any other surfaces that may require a hard surface.

The radical polymerization may be started by UV-irradiation. The UV-irradiation may be performed for a duration of about 8 minutes to about 12 minutes, about 8 minutes to about 10 minutes or about 10 minutes to about 12 minutes.

The coated film may be cured at a temperature in the range of about 100° C. to about 140° C., about 100° C. to about 120° C. or about 120° C. to about 140° C.

The coated film may be cured for a duration of about 8 minutes to about 12 minutes, about 8 minutes to about 10 minutes or about 10 minutes to about 12 minutes.

A polymer coating that may be obtained by the process as defined above.

Use of the polymer coating as defined above may be for anti-scratch automotive top coats.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a schematic illustration of the construction of a cross-linked network through the connection of polymer chains between functional silane nanoclusters.

FIG. 2 is a schematic illustration of the construction of a physically cross-linked network through fastening of polymer chains to poly(OVPOSS) blocks.

FIG. 3 is a graph showing the anti-scratch capability of the coating on the left Y-axis and the thermal stability (° C.) on the right Y-axis (representing the temperature at which 50% mass loss occurred), plotted against the loading (wt % of the OVPOSS nanoparticles).

FIG. 4 is a TEM image of a thin OV-MMA-40 slice, which shows radiation chains from the two-types of particles. Scale bar represents 0.5 μm.

FIG. 5 refers to SEM images of the surface morphologies of (A) OV MMA-40 and (B) OV-AN-50 coating matrices with 1000× magnification. Scale bar represents 10 μm.

FIG. 6 refers to (A) a graph showing the XRD pattern of the OV-AN-50% composite matrix (602 and 604 are scans of the two repeating samples), while 606 is the control sample, and (B) the SEM image of the OV-AN-50% composite matrix.

FIG. 7 is a graph showing the SDC profiles of the PAN and PMMA, respectively formed together with the polyOV-POSS in a photo-induced free radical polymerization system.

FIG. 8 is a graph showing the DSC profiles of OV-MMA-x-IPN matrices that have different levels of hybrid cross-linking.

EXAMPLES

Non-limiting examples of the invention and a comparative example will be further described in greater detail by reference to specific Examples, which should not be construed as in any way limiting the scope of the invention.

Example 1: Materials and Overview

Materials
Silanes and Cross-Linking Agents:
3-aminopropyltrimethoxysilane (APTMS) (97%) was purchased from Sigma Aldrich.
OctaVinyl POSS (OVPOSS) reagent was supplied by Hybrid Plastics.
Polymers:
Predominantly poly(methyl methacrylate) (PMMA) resin was purchased from Dow under the commercial name PARALOID® A-11.
Monomers:
(i) Glycidyl Methacrylate (GMA) (97%) was purchased from Aldrich.
(ii) Vinyl Monomers:
Methyl Methacrylate (MMA) was purchased from Aldrich. Styrene (>99%) was purchased from Aldrich. Acrylonitrile (>99%) was purchased from Aldrich. Methacrylic Acid (MA) (99%) was purchased from Aldrich.
Solvents:
Anhydrous benzyl alcohol (>99%) was purchased from Alfa Aesar. ACS grade butyl acetate (>99.5%) was purchased from Sigma Aldrich. Analytical grade 1-Butanol (>99.5%) was purchased from Emsure. Analytical grade Tetrahydrofuran was purchased from Tedia. Analytical grade Ethanol was purchased from Emsure. Analytical grade Toluene was purchased from MERCK.
Heat and UV-Curing Initiators:
2,2-Dimethoxy-2-phenylacetophenone (DMPA) was purchased from Merck.
Overview
This invention involves the exploration of a hybrid composite polymer matrix, assembled by integrating two polymer networks, as an anti-scratch coating for automobiles. Two types of particulate silane cross-liners are utilized to construct two respective hybrid polymer networks with a unique chain-from-particle structure. The two types of particulate silane cross-linkers used are (i) nanosilane clusters with manifold of out-stretched primary amino groups on their surface and (ii) nano to micron sized blocks assembled by employing oligomerized octavinyl polyhedral oligomeric silsesquioxane (OVPOSS).

Example 2: First Type of Hybrid Network—Sol-gel Derived Silane Nano-Clusters

Preparation of PARALOID™ A-11 polymer solution
PARALOID™ A-11 powder (6.3 g) was added in a binary solvent consisting of 1-butanol (10 ml) and butyl acetate (60 ml). The mixture was then stirred until a clear solution was formed. The solution had a concentration of PARALOID™ A-11 of 0.09 g/ml.

2. Preparation of the Chemically Bound Hybrid Network

The first type of cross-linked network was generated through multi-site grafting of a copolymer to the silane nanoclusters. The grafting chemistry involved a simple reaction between epoxide and primary amine.

To 9 ml of the PARALOID™ A-11 polymer solution prepared in advance, glycidyl methacrylate (GMA) (0.34 ml), a vinyl monomer (methyl methacrylate (MMA) (0.273 ml)), a free radical initiator (2,2-dimethoxy-2-phenylacetophenone (DMPA) (0.0248 g)), and 3-amino propyltrimethoxylsilane (APTMS) (0.447 ml) were added. The mixture 102 was stirred until a homogeneous solution was obtained, in which the molar ratio of GMA/MMA/APTMS is 1:1:1. After that, a given amount of the solution was cast on a glass panel substrate to form a liquid coating layer. This amount depends on the coating area. For example, in this experiment, an area of 2 cm×4 cm on a glass slide was coated, and for the is, about 0.3 g was cast, giving roughly 0.04 g/cm$^2$. This was subsequently subjected to UV-irradiation (polymerization and alkylation 104) for 10 min to form a gel layer. This step lead to a pre-crosslinking polymer structure 106. This was followed by curing the gel layer at 120° C. for 10 minutes to dry and consolidate the coating layer, through which the condensation (sol-gel reaction 108) of the pendant APTMS groups to form the nanocluster-tightened networks occurred concurrently. Consequently, the copolymer chains 110 are tied by the nanoclusters derived from APTMS to form the functional silane cluster 112 as depicted by FIG. 1. As indicated above, in this hybrid-network forming process, a poly(methyl methacrylate) (PMMA) resin (PARALOID™ A-11) is present as the main component to assure adhesion of the coating to the substrate.

Example 3: Second Type of Hybrid Network—Poly(OVPOSS) Blocks Physically Grafted with Acrylic Polymer Chains 1. Preparation of OVPOSS Solution Octavinyl-POSS (OVPOSS) was weighed in a 25 ml capped glass vial. Tetrahydrofuran (THF) was then added in the vial and the mixture was sonicated for approximately 5 minutes to facilitate the dispersion of OVPOSS. The resultant dispersion was then homogenized using a vortex mixer for 10 seconds to achieve a clear transparent solution, which has a concentration of OVPOSS of 0.1 g/ml.

2. Preparation of the Physically Bound Hybrid Network

To 9-ml of the PARALOID™ A-11 polymer solution prepared in Example 2, glycidyl methacrylate (GMA) (0.34 ml), a vinyl monomer (methyl methacrylate (MMA) (0.273 ml)), the OVPOSS solution (4.05 ml) as prepared above, and a free radical initiator (2,2-dimethoxy-2-phenylacetophenone (DMPA) (0.0248 g)) were added. The mixture was converted to a homogeneous solution after thorough mixing, in which the molar ratio of GMA/MMA/OVPOSS was 1:1:0.25. After the coating formula was prepared, a given amount of the solution was cast on a glass panel substrate to form a liquid coating layer. This amount depends on the coating area. For example, in this experiment, an area of 2 cm×4 cm on a glass slide was coated, and for the is, about 0.3 g was cast, giving roughly 0.04 g/cm$^2$. It was subsequently subjected to UV-irradiation for 10 minutes to form a gel layer that resulted in formation of both the copolymer and poly(OVPOSS). Finally, the gel layer was cured at 120° C. for 10 minutes, which also dried and consolidated the coating layer. Copolymerization of these two acrylic monomers (GMA and MMA) formed a binary random copolymer. As OVPOSS can only undergo a minor degree of free-radical copolymerization with the two acrylic monomers according to the traditional Q-e scheme due to there being a rather different free radical addition reactivity between Si—CH=CH$_2$ and CH$_2$=CR$_1$C(O)OR$_2$, blocks of poly (OVPOSS) having sizes ranging from the nano to micrometer scale mechanically clipping the copolymer chains of the acrylic monomers was generated. Consequently, each polymer chain associated with a number of different blocks, constructing a physically cross-linked network.

As indicated above, the presence of poly(methyl methacrylate) (PMMA) (PARALOID™ A-11) in the polymerization mixture as the main component of the coating ensures excellent adherence of the coating to a variety of substrates. OVPOSS would undergo only low degrees of polymerization because the vinyl group of OVPOSS has low radical stability and substantially low diffusivity upon polymerization. As a result, a certain portion of PARALOID™ A-11 and the newly formed acrylic copolymer chains are mechanically pinned 202 to the blocks of OVPOSS 204 when they are formed, as illustrated in FIG. 2. Such a network relies primarily on simultaneous mechanical anchoring of polymer chains with a group of poly(OVPOSS) blocks.

Example 4: Integration of First and Second Type Hybrid Network

Neither the first nor the second type of cross-linked network (as described above), taken alone, could provide even slightly better mechanical strength than the pristine PARALOID™ A-11 matrix. However, integrating these two networks significantly augments the mechanical property of the polymer, as shown in FIG. 3. The coating matrices obtained were shown to be hard enough to offer a gouge resistance as high as 5H by the pencil hardness test (ISO-15184/ASTM-D3363) compared to a benchmark commercial coating that has a hardness value of 3-4H. In FIG. 3, the anti-scratch capability of the coating is shown on the left Y-axis and the thermal stability (° C.) on the right Y-axis (representing the temperature at which 50% mass loss occurred), plotted against the loading (wt % of the OVPOSS nanoparticles). Data for OV-MMA (302) and OV-AN (304) are shown.

To fabricate such an anti-scratch coating matrix, the precursors of these two hybrid networks and a commercial PMMA resin (PARALOID™ A-11) were mixed at a given mass ratio and the resulting coating layer was subsequently subjected to UV-curing and thermal curing. The two networks when generated together are intimately interlocked with the PARALOID™ A-11 polymer chains interpenetrating through them. The PARALOID™ A-11 resin serves as the main component of the coating because of its optical and adherent properties.

As a typical preparation, to a 9-ml PARALOID™ A-11 polymer solution prepared in Example 2, glycidyl methacrylate (GMA) (0.34 ml), a vinyl monomer (methyl methacrylate (MMA) (0.273 ml)), a free radical initiator (2,2-dimethoxy-2-phenylacetophenone (DMPA) (0.0248 g)), 3-amino propyltrimethoxylsilane (APTMS) (0.447 ml), and the OVPOSS solution prepared in Example 3 (4.05 ml) were added. The mixture was stirred until a homogeneous solution was obtained, in which the molar ratio of GMA/MMA/APTMS/OVPOSS is 1:1:1:0.25. Subsequently, a given amount of the solution was cast on a glass panel substrate to form a liquid coating layer. This amount depends on the coating area. For example, in this experiment, an area of 2 cm×4 cm on a glass slide was coated, and for the is, about 0.3 g was cast, giving roughly 0.04 g/cm². It was subsequently subjected to UV-irradiation for 10 min to form a gel layer. This step lead to a physically cross-linked network in which poly(OVPOSS) blocks serve as cross links. This step was followed by curing of the gel layer at 120° C. for 10 min to dry and consolidate the coating layer, through which the condensation (sol-gel reaction) of the pendant APTMS groups to form the nanocluster-tightened networks occurred concurrently. Consequently, two interpenetrating polymer networks known as the Interpenetrating Polymer Network (IPN) structure was formed. The method for preparing such an Interpenetrating Polymer Network (IPN) can be adjusted by varying the content of APTMS and OVPOSS in the mixture with GMA, acrylic monomer and PARALOID™ A-11, but maintaining the mass ratio of APTMS to OVPOSS at 1.13:1 (or a mole ratio of 4:1). A representative formulation (mole ratio) is composed of components of APTMS:OVPOSS:GMA:vinyl monomer at 4:1:4:4. The amount of PARALOID™ A-11 used is fixed regardless of the variation of the absolute amounts of the rest of the components.

For the purpose of the application, the polymer matrices have been given the following nomenclature:

OV-MMA-x

The first and second networks+P(MMA-GMA) copolymer+PARALOID™ A-11, where the vinyl polymer used is methyl methacrylate (MMA).

OV-AN-x

The first and second networks+P(AN-GMA) copolymer+PARALOID™ A-11, where the vinyl monomer used is acrylonitrile (AN).

The suffix "-x" represents the mass percentage of OVPOSS in the mixture with GMA and the acrylic monomer used. For instance, OV-MMA-40 coating is produced from the mass ratio of APTMS:OVPOSS:GMA:MMA:PARALOID™ A-11=10:11.3:8.7:6.3:25.

Microstructures

It is important to highlight that the formation of both cross-linked networks takes place simultaneously to ensure interpenetration. Also, the mechanical traits of these two cross-linked networks are mutually complementary because the silane-nanocluster-sustained network is covalently bonded and hence more rigid than the poly(OVPOSS) block-sustained network formed through physical anchoring. A TEM image of a carefully sliced OV-MMA-40 sample shows the proposed particle-to-chain network structure (FIG. 4). The scale bar represents 0.5 µm.

There are two types of particles which can be differentiated by size and transparency. The large black particles have sizes of approximately 1 µm and bear less dendritic polymer chains. This may be attributed to the presence of poly(OVPOSS) blocks. In contrast, the grey particles have sizes of approximately 0.1 µm or less and may be attributed to the presence of silane nanoclusters.

The microstructures of the two selected coating surface matrices OV MMA-40 (A) and OV-AN-50 (B) as shown in FIG. 5 all exhibit heterogeneous patterns as a result of the formation of the particle-to-chain network. They have the structural characteristic of radiating polymer chains that possess ordered chain assembling in contrast to when the chains undergo random entangling. In particular, the OV-AN-50 matrix contains densely distributed fern leaf-like dendrites. These fern leaves were found to be crystallites as shown by XRD (FIG. 6). The characterization suggests that the presence of poly(OVPOSS) blocks facilitated stereospecific polymerization of acrylonitrile (AN) since only the formation of a tactic polymer could allow crystallization to take place. To further confirm this hypothesis, AN was subjected to polymerization in the presence of only OVPOSS. A large amount of crystals could be harvested, which is known to be formed due to the presence of aligned polyacrylonitrile (PAN) chains (602 or 604) rather than the presence of poly(POSS).

Differential Scanning calorimetric Analysis

This assessment was confirmed by differential scanning calorimetric (DSC) analysis, in which the crystallization and melting heat of the polymer occurred at approximately 125° C. and 170° C., respectively (FIG. 7). This signifies the impact of the poly(OVPOSS) blocks on the spatially regular polymerization of AN. Presumably the interior void of poly(OVPSS) blocks provides a special template that enables tactic polymerization.

Whether the MMA monomer could undergo a special manner of polymerization to result in a defined polymer chain configuration was investigated. The DSC analysis of the polymer blend obtained from the polymerization of a mixture consisting of MMA and OVPOSS showed a broad exothermic peak ranging from 110 to 175° C. instead of the usual glass transition endothermic step which occurs at temperatures ranging from 95 to 105° C. (FIG. 7). This output is different from the same polymerization system where the OVPOSS loading is significantly lower. The exothermic transition behavior of the PMMA reflects ordered chain packing that is driven by close alignment of PMMA chains, which suggests the presence of tactic chains. It is important to note that these ordered-packed PMMA chains are stronger than their randomly aggregated counterparts. The alignment of PAN chains (702), alignment of PMMA chains (704) and thawing of PAN crystallites (706) are shown in FIG. 7.

Viscoelastic Property

As described above, the IPN matrix is composed of the two hybrid networks and PMMA resin PARALOID™ A-11 being at least 50% by weight. The thermal response of PARALOID™ A-11 in the IPN was investigated to understand how the crosslinking degree of IPN affects its viscoelastic behavior. The DSC profiles of OV-1-x (equivalent to OV-MMA-x) IPN series (FIG. 8) demonstrate such structural changes. Data for blend with A-11 (802), OV1-4 (804), OV1-8 (806), OV1-20 (808), OV1-40 (810) and OV1-50 (812) are shown. There are two types of PMMA chains in OV-1: those formed in-situ to form copolymer chains with GMA and those that are from PARALOID™ A-11. However, only the glass transition behavior of PARALOID™ A11 homo-PMMA chains could be measured since it is the dominant species. According to DSC analysis, the glass transition temperature and the corresponding energy barrier (i.e. depth of the glass transition step) of PARALOID™ A-11 gradually reduces with an increase in extent of cross-linking. This could be due to de-entanglement of the PARALOID™ A-11 chains since they are stretched out as the IPN is extended. The IPN matrix therefore becomes more viscoelastic as the viscous component arises from the penetrating PARALOID™ A-11 chains and the elasticity arises from the more concentrated network resulting from an increase in the extent of cross-linking.

INDUSTRIAL APPLICABILITY

The hybrid Interpenetrating Polymer Network polymer coating matrix described in this disclosure may be useful as a type of unique anti-scratch coatings for surfaces such as automotives, furniture, metals, glasses, plastics and other substrates that need hard surfaces because of its improved resilience, or the energy spent to cause elastic deformation, against scraping, which may be good impact resistance.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A polymer composition comprising:
   a) 30 to 50 wt % of a 300,000 to 500,000 molecular weight poly(vinyl) polymer,
   b) 3 to 30 wt % of a silane,
   c) 3 to 30 wt % of a polyhedral oligomeric silsesquioxane cage component,
   d) 5 to 25 wt % of a functionalized vinyl monomer, and
   e) 3 to 30 wt % of a vinyl monomer.

2. The polymer composition according to claim 1 wherein the molar ratio of silane to polyhedral oligomeric silsesquioxane cage component is between about 6/1 and 2/1 or the weight ratio of components (c+d+e) is between 30 and 50 percent by weight of components (a+b+c+d+e).

3. The polymer composition according to claim 2 wherein components a/b/d/e are present in a mass ratio of about 25/10/6-8/6-8.

4. The polymer composition according, to claim 1 wherein the poly(vinyl) polymer is poly(methyl methacrylate) or is a blend of poly(methyl methacrylate) with other polymers.

5. The polymer composition according to claim 1 wherein the polyhedral oligomeric silsesquioxane cage component is octavinyl polyhedral oligomeric silsesquioxane.

6. The polymer composition according to claim 1 wherein the silane is 3-aminopropyltrimethoxysilane and the functionalized vinyl monomer is an acrylic monomer bearing a glycidyl group.

7. A process for making a polymer coating comprising:
   a) preparing a polymer composition comprising:
      i) 30 to 50 wt % of a 300,000 to 500,000 molecular weight poly(vinyl) polymer,
      ii) 3 to 30 wt % of a silane,
      iii) 3 to 30 wt % of a polyhedral oligomeric silsesquioxane cage component,
      iv) 5 to 25 wt % of a functionalized vinyl monomer, and
      v) 3 to 30 wt % of a vinyl monomer, by mixing components i) through v) and optionally adding a radical polymerization initiator,
   b) homogenizing the mixture,
   c) coating a substrate with the obtained mixture,
   d) starting, a radical polymerization, and
   e) curing the prepared coated film at elevated temperature.

* * * * *